United States Patent Office 3,006,376
Patented Oct. 31, 1961

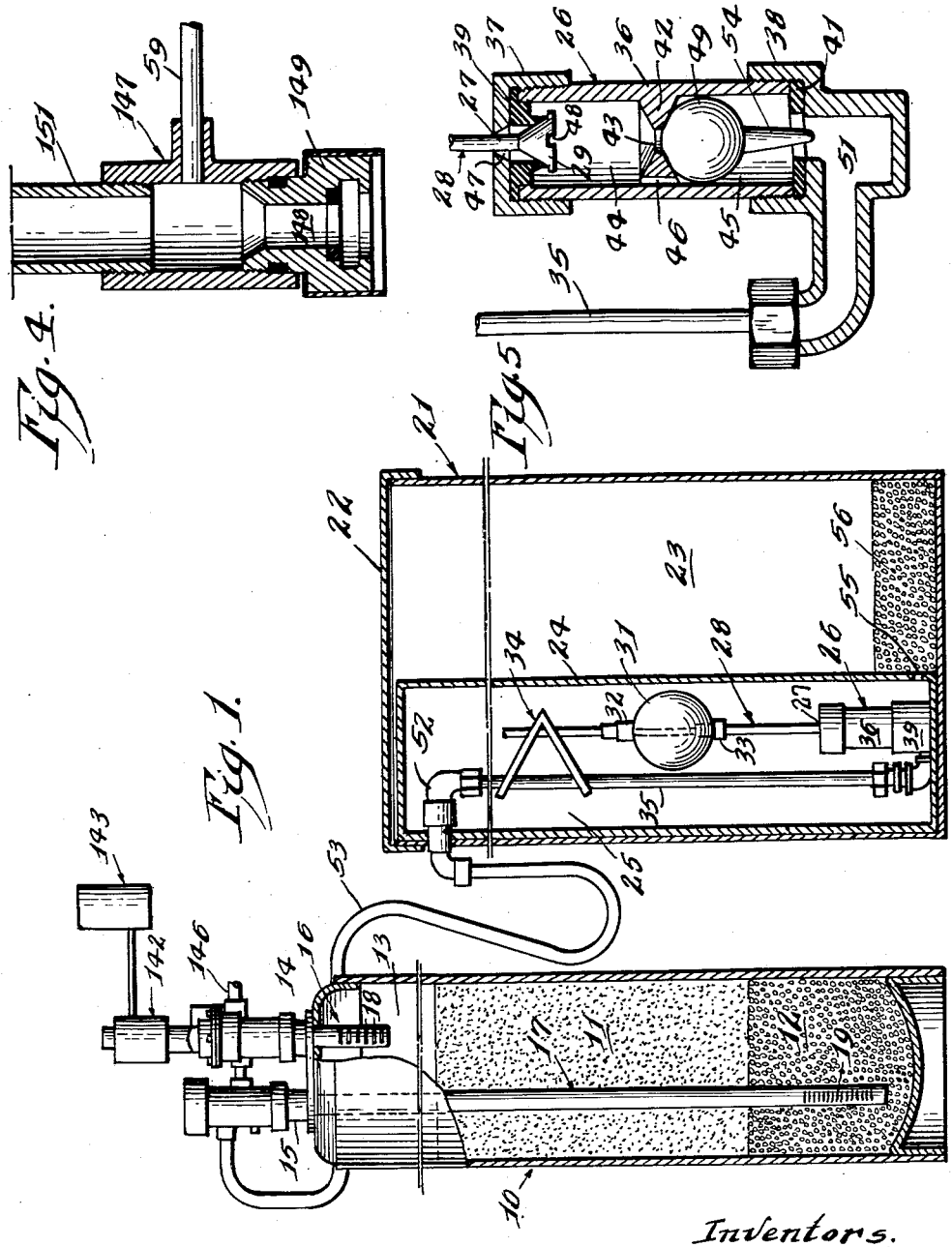

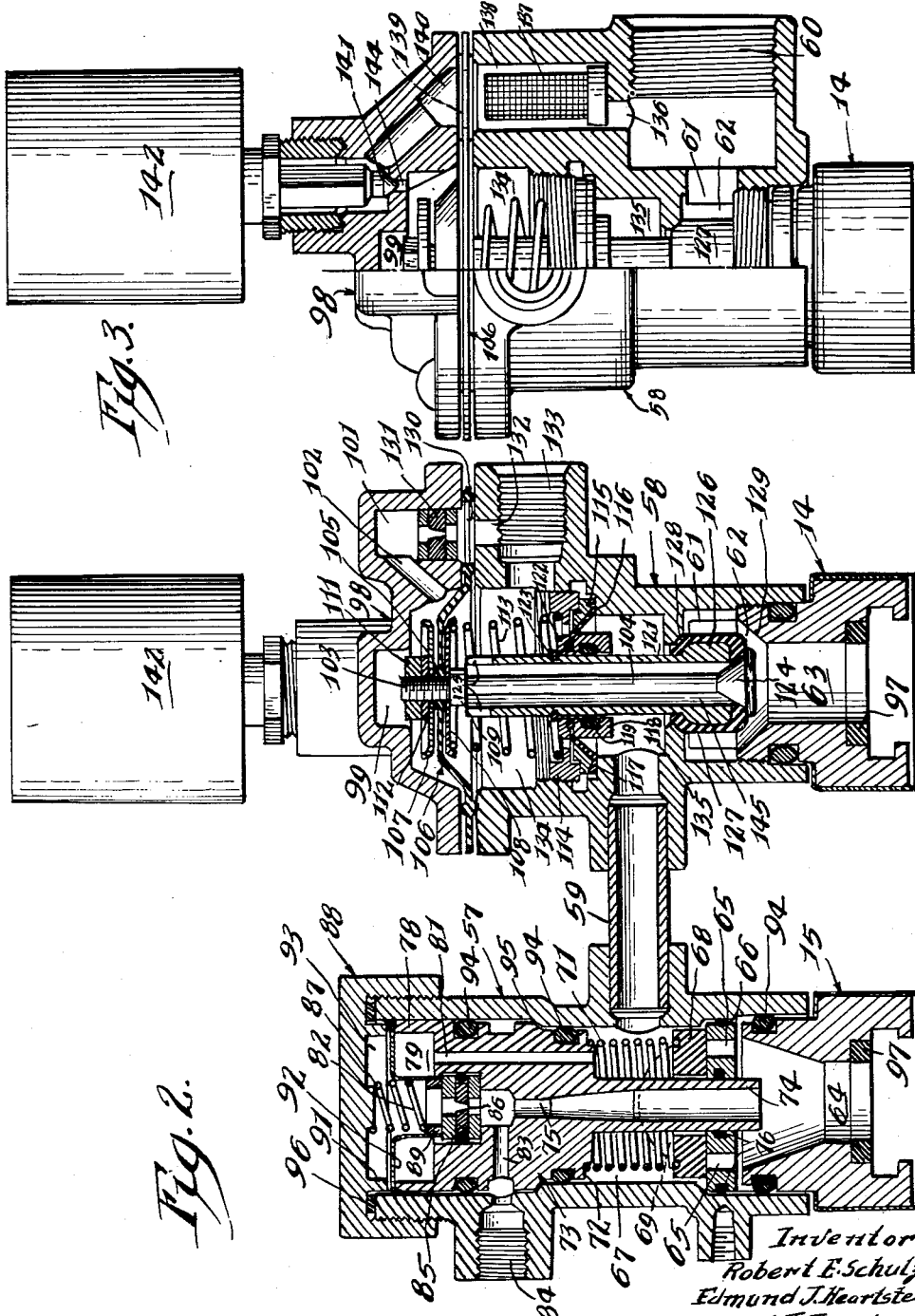

3,006,376
AUTOMATIC CONTROL VALVE FOR WATER SOFTENERS OR CONDITIONERS
Robert E. Schulze, Deerfield, and Edmund J. Heartstedt, Glenview, Ill., and Robert J. Jauch and Christian W. Kruckeberg, Fort Wayne, Ind., assignors to Culligan, Inc., Northbrook, Ill., a corporation of Delaware
Filed Apr. 28, 1958, Ser. No. 731,359
13 Claims. (Cl. 137—630.19)

The present invention relates to a novel automatic control and directional valve for controlling the direction of flow in automatic water softeners, conditioners and filters during normal service and during reactivation or regeneration.

In our application Serial No. 628,585, filed December 16, 1956, we disclosed one form of directional valve for automatic water softeners or conditioners, but in which the inlet and outlet fittings required predetermined placement and accurate spacing to permit the installation, removal and replacement of the service tank.

To accomplish certain basic objectives of the present invention, including versatility, cost and simplicity of construction and servicing, the valve assembly has been designed, constructed and assembled into two separate halves or units, one of which may be termed as the inlet control half and the other as the outlet eductor half, and these halves connected only by a simple conduit or by-pass for effecting successful operation.

In the present novel valve assembly with the valve constructed in two parts or halves one of which is connected to the inlet and the other to the outlet of the tank, spacing of the inlet and outlet is unimportant as all that is required to connect these halves for successful operation is to join them by a single pipe or conduit. Thus the spacing between the inlet and the outlet, as in the use of tanks of different designs, may vary but the valve assembly can be easily and quickly installed and will function effectively and as intended when these two halves are connected.

With all the operating parts in one of the halves or units of the valve assembly, the necessity of having interconnecting ports to cause actuation of the multiple diaphragms, such as required in the valve of our above noted copending application, has been eliminated.

In the event the present valve assembly is intended for use with a filter unit requiring only backwashing for removal of the undesirable constituents when the filter no longer operates efficiently, the present invention requires only the use of the operating half or valve unit and the eductor half may be replaced by a simple T connection for making the connections for by-pass, supply lines, and the outlet to the filter.

As the present novel control assembly may be operated in any position, horizontal or vertical, it has a wide field of application and use.

Although a solenoid valve is disclosed as the pilot mechanism for operating the valve unit, in the present assembly, the solenoid valve prevents line pressure from entering the operating chamber of the cap and thus the action is the reverse of that in the three-diaphragm valve of the above co-pending application. In that application the solenoid valve is employed to retain pressure behind certain of the diaphragm assemblies, and when the solenoid is energized it relieves the chambers to atmospheric pressure, causing the valves to be opened.

The present invention further comprehends the provision of a novel eductor system embodying a pressure sensitive flow control as the orifice ahead of the throat rather than a fixed-type orifice which would have an increasing amount of waste as line pressure would increase in various areas of use. By the use of such a flow control the present unit is capable of operating over a wide pressure range from approximately 15 to 150 p.s.i. with a single nozzle and a flow control.

Another important feature of the present invention is the provision of a novel valve assembly including a drain valve and a main operating plunger valve which are concentrically arranged and thereby reduce the number of operating diaphragms. In this concentric arrangement the drain valve must be opened prior to shifting the main plunger directional valve, whereby by-pass water cannot flow to the eductor and draw in brine without the drain valve being first opened.

By spring-loading the drain valve to force it shut and retain it closed while in service position, leakage of water to waste is prevented even though the line pressure is completely shut off. This is important for in the event the plumbing system requires repair and the main water valves are shut off, it is possible that drain valves which are held shut by water pressure alone, may open as this pressure is relieved when the repairs are being made and this opening of the drain valve may cause a siphon action by permitting water to flow out through the drain opening.

Another feature of the present invention is the provision of a novel valve assembly in which the stem of the operating plunger valve is hollow and permits it to function as a conduit.

The present invention further comprehends means for reducing the possibility of water hammer in connection with the functioning of the check valve in the eductor unit. This check valve is opened by being lifted from its seat by water flowing in an upflow direction during service operation, and as this flow is terminated the check valve settles back and remains in its lowered, closed position when regeneration is indicated. In some homes as water flows in the plumbing system and a service valve is suddenly shut off or closed, water continues to coast under inertia through the valve due to the compressing of air in the air chambers of the plumbing system. When this air is compressed, the water momentarily reverses its direction of flow and, if the check valve is not seated, this reversal of flow would cause the check valve to slam shut and result in a reactance water hammer. To eliminate or reduce the possibility of water hammer, an expansion spring is provided for positively seating and closing the check valve before the water momentarily reverses itself, the pressure being relieved through the eductor channels when the check valve is closed.

Other objects, advantages and features of the present invention include the provision of a novel valve assembly which is fully hydraulic in action and provided with an automatic by-pass when in its regeneration position so that a water supply is always available in the service line of the home. The novel valve assembly has no close fitting parts, sleeves or bearings, and the solenoid valve merely passes pilot water and does not need to handle waste brine. Furthermore, the action of the valve is one of a short stroke and capable of operating efficiently over a pressure range of approximately 2 to 200 p.s.i.

Further objects are to provide a construction of maximum simplicity, efficiency, economy and ease of assembly and operation, and such further objects, advantages and capabilities as will later more fully appear and are inherently possessed thereby.

The invention further resides in the construction, combination and arrangement of parts illustrated in the accompanying drawings, and while there is shown therein a preferred embodiment, it is to be understood that the same is susceptible of modification and change, and comprehends other details, arrangements of parts, features and constructions without departing from the spirit of the invention.

In the drawings:

FIGURE 1 is a view, part in front elevation and part in vertical cross section, of an automatic water conditioning system embodying the present novel automatic control valve unit shown in front elevation above the service tank for the automatic control of the system and the direction and path of flow in the service and regeneration cycles.

FIG. 2 is an enlarged view in vertical cross section taken longitudinally and centrally through the valve control unit shown in front elevation in FIG. 1, the outlet eductor half of the valve control unit being shown at the left and the spaced inlet control half being shown at the right, and also showing the manner in which the portable service tank may be readily and easily installed, removed and replaced.

FIG. 3 is a view, part in end elevation and part in vertical cross section, of the right-hand side of the inlet control half of the valve assembly shown in FIG. 2.

FIG. 4 is a view in vertical cross section of a T connection adapted to replace the outlet eductor half of the valve unit or assembly when backwashing or rejuvenating a filter which does not require the addition of a chemical or brine solution.

FIG. 5 is an enlarged view in vertical cross section through the brine valve or liquid level control shown in FIG. 1 in the float chamber of the brine tank.

Referring more particularly to the disclosure in the drawings in which is shown an illustrative embodiment of the present invention of a directional valve for controlling the operation of automatic water conditioners of the type shown in FIG. 1, including a portable service tank 10 containing a loose and relatively deep bed of treating minerals or material 11 disposed upon and above a gravel or filter bed 12 in the bottom of the tank and extending to the desired level or height but shown as spaced a suitable distance below the top of the tank to provide a free board space 13 thereabove.

The bed of minerals or treating material in the tank may be an ion exchange material of the resinous or siliceous type which during the ion exchange, water softening or conditioning operation, tends to become inactivated by ion exchange resulting in a reduction in the quality of the effluent. When the quality of the effluent reaches a point where it is no longer suitable for the purpose intended, the bed of treating material requires reactivation or regeneration.

The service tank 10 employed is of the portable type and provided with slip couplings or fittings at 14 and 15 whereby the service tank may be quickly installed, removed or replaced, when necessary. The slip couplings or connectors 14 and 15 are connected to an inlet tube or manifold 16 and to an outlet tube or manifold 17, respectively, each of which depends into the tank. The inlet manifold 16 is closed at its lower end with this end disposed above the bed of minerals 11 and provided with spaced, relatively wide slots 18 for the uninterrupted flow therethrough of untreated water into the tank. The water to be treated flows downwardly through the loose bed of treating material or minerals 11, then through the filtering bed 12 from where it enters the finely slotted strainer section 19 at the lower closed end of the outlet tube or manifold 17 which is embedded in the bed of filtering material 12. This permits the uninterrupted passage of the treated water into the outlet tube 17 but effectively filters out any suspended solids from the bed.

When the bed of treating minerals or conditioning material requires cleansing and regeneration or reactivation, it is contemplated in automatic water softening or conditioning apparatus of the type here disclosed to automatically accomplish the regeneration steps and at frequent intervals, such as at a predetermined period of the day or night when treated or conditioned water is not required in the service line. To accomplish such automatic regeneration, the present invention contemplates novel time control valve mechanism which automatically initiates at a set time period the steps of backwashing, brining and rinsing of the material in the tank and, when such steps have been accomplished, automatically returning the system to normal service operation.

To accomplish the brining cycle in the steps of regeneration, the present automatic water conditioning system contemplates a float valve and brine tank assembly of the type shown and described in the application of Robert E. Schulze and Edmund J. Heartstedt, Serial No. 648,043, filed March 25, 1957, now Patent No. 2,920,644. It includes a brine tank 21 having a removable cover 22 for access to the salt chamber 23 of the tank. This salt chamber is separated by a vertical wall or partition 24 from a float chamber 25 containing a float valve assembly including a valve body 26 in its base. Into this valve body projects the lower end 27 of a float rod or stem 28 carrying at its lower end a valve 29 and provided intermediate its ends and outside the valve body or housing 26 with a float ball 31 adjustably mounted on the rod or stem 28 and retained in adjusted position by an upper and a lower ball retainer or positioner 32 and 33. To guide the float ball 31 on the rod or stem 28 in its vertical movement and to control the depth of liquid in the float chamber 25, there is provided a substantially V-shaped guide 34 having its spaced and diverging legs anchored on a vertical length of pipe or tubing 35 in the float chamber 25.

The valve body 26 consists of a cylindrical member or housing 36 externally threaded at its opposite ends to receive at its upper end a threaded cap or cover 37 through which projects and is freely slidable the lower end 27 of the valve rod or stem 28, and to receive at its lower end a threaded base 38. A gasket or annular sealing ring 39 and 41 is provided at the opposite ends to effectively seal between the ends of the cylindrical member 36 and the threaded cap or cover 37 at one end and the base 38 at the other. The gasket or sealing ring 39 is provided with a depending flexible lip or sealing contact with the valve 29.

The cylindrical member 36 of the valve body 26 is provided intermediate its length with a transverse partition 42 tapering or dished toward the center where it is provided with a centrally-disposed opening 43 communicating between an upper chamber 44 and a lower or air check chamber 45. An offset opening or port 46 in the transverse partition 42 forms a continuously open bypass between the chambers 44 and 45.

A central opening 47 is provided in the cap or cover 37 through which is vertically and freely movable the valve rod or stem 28 to the lower end of which is affixed the valve member 29. This valve member is provided with a tapered shank portion with its lower face diametrically slotted at 48 whereby when the float 31 and its rod or stem 28 are lowered to seat the valve member on the upper surface of the ported transverse partition 42, liquid entering the valve body or housing 26 through the port or opening 47 in the cap and about the stem 28 is adapted to flow from the upper chamber 44, through the slots 48 and port or opening 43 into the lower or air check chamber 45 of the valve body 26.

In this lower or air check chamber 45 is provided a ball valve 49 preferably of a plastic or composition unaffected by the brine and capable of seating against the underside of the transverse wall or partition 42 when elevated as shown in FIG. 5. When the ball valve 49 is in its fully lowered position it seals off flow through the lower ported gasket or sealing ring 41 and connected passage 51 in the base 38 to the pipe or tubing 35 leading to the exterior of the brine tank 21. The pipe or tubing 35 is connected at the exterior of the brine tank 21 by suitable connectors at 52 to a flexible tubing 53 and then to the novel control valve assembly as hereinafter set forth.

To maintain the ball valve 49 in vertical position and prevent free rotation thereof, it is shown provided with a depending tail or locating projection 54 depending into and through the sealing ring or gasket 41 and into the bore or passage 51 in the base 38 of the valve body.

The wall or partition 24 dividing the salt chamber 23 from the float chamber 25 is provided with an opening 55 adjacent its lower end for passage therebetween. This salt chamber is of substantial capacity for receiving therein a large amount of dry, bulk salt and storing this salt and sterilizing agent to supply the regenerant or brine needs for a substantial period of time. The rubber positioners or retainers 32 and 33 on the float rod or stem 28 are adjustable to vary the quantity of brine for regeneration by controlling the quantity of water delivered to the brine tank for dissolving salt placed in the chamber 23 and above a bed of gravel 56 through which the brine is filtered and exits through the port 55 into the float chamber 25 from where this brine then enters the upper chamber 44 of the valve body 26 through the port or opening 47 in the cap 37.

The novel control valve assembly of the present invention for directing flow through the water conditioning system is shown more particularly in FIGS. 2 and 3. It consists of an eductor body 57 and a valve body or housing 58 interconnected by a by-pass tube 59. The valve body 58 is connected to the hard or untreated water supply and is provided with a large inlet opening or port 60 connected to a supply pipe or line carrying the entering hard or untreated water, a communicating port 61 leading to a chamber 62 and into and through the bore or passage 63 in the female part of the slip coupling or connector 14, from where the water flows normally to the inlet distributor or manifold 16 depending into the service tank 10. The conditioned water after treatment in the tank is discharged through the outlet tube or manifold 17, through the bore or passage 64 in the female part of the slip coupling or connector 15 and into the eductor body 57. From the passage 64, the treated water passes through openings or ports 65 provided in a spider 66 and into a chamber 67 in the eductor body upon raising a spring-loaded check valve 68 in this chamber and out through a large outlet opening or port 69 at the rear of the eductor body 57.

The check valve 68 is preferably of natural or compounded synthetic rubber and spring-loaded by an expansion spring 71 which has one end engaging or seating upon the check valve and the other end abutting a shoulder 72 on an eductor housing 73. This eductor housing is mounted within but is separable from the eductor body 57 and at its lower end is provided with a depending tubular part 74 providing a throat or passage 75 for the eductor, this tubular part projecting through the spider 66, the check valve 68 and the encompassing coil spring 71. The spider 66 as well as the eductor housing may be of a plastic composition, with the outer periphery of the spider and the inner periphery thereof grooved to receive a pair of O-rings 76 for sealing and limiting flow through the spaced openings 65 in the spider, and then only when the velocity pressure of the water being discharged is sufficient to elevate the check valve 68 from the spider 66 to open the ports 65.

The eductor housing 73 is provided with a cupped upper end including an annular upstanding flange 78 forming a chamber 79 communicating with a channel 81 opening into the chamber 67 in the housing, a channel 82 and a channel 83 opening into the threaded connection 84 receiving the outer end of the flexible tube 53 connected to the float chamber 25.

In the upper portion of the eductor housing 73 below the chamber 79 is provided a recess receiving a flow regulator 85 having a constriction 86. A coil spring 87 seats at one end against the underside of an eductor cap or closure 88 and at its lower end against a collar 89 bearing upon the upper surface of the flow regulator 85. The nozzle 86 is disposed adjacent to and aligned with the throat or constriction 75 of the eductor housing 73.

The eductor cap 88 is provided with a threaded external flange for attachment to the upper end of the eductor body 57 and a depending annular flange 91 spaced inwardly from the threaded flange and a centering embossment for locating the upper end of the coil spring 87. The depending annular flange 91 is adapted to clamp down the upstanding flange 78, the peripheral edge of an eductor screen 92 with the inturned central portion of this screen depending as a cylindrical part into the recess of the eductor housing where its lower end tightly encompasses the collar 89 and divides the chamber 79 from an upper chamber 93.

Suitable sealing or O-rings 94 are arranged in annular, outwardly opening grooves in the circumference of the eductor housing 73 and having sealing contact with the interior wall of the eductor body 57. When the parts are assembled in the eductor body 57, an annular tapered or inclined shoulder on the eductor housing 73 seats upon a complementary tapered or inclined shoulder on the eductor body at 95 which limits the depth of penetration of the eductor housing 73 in the body 57.

An O-ring 94 is also provided in an annular channel or groove on the female part of the slip couplings or connectors 14 and 15, and having sealing contact with an encompassing surface or interior wall of the eductor body 57. An O-ring is also provided in an annular outwardly opening channel on the flow regulator, and a gasket or washer 96 is provided at the top and another gasket 97 in the female part of the couplings or connectors 14 and 15 for sealing contact with the male part of these couplings or connectors.

The valve body 58 in addition to the inlet opening 60, communicating port 61 and chamber 62, is provided at the top with a hollow diaphragm cap 98 having spaced chambers 99 and 101 joined by a connecting channel 102. Into the chamber 99 projects the upper threaded end 103 of a drain valve stem 104 to which is attached the central, elevated portion 105 of a resilient or rubber diaphragm 106, the central portion 105 of the diaphragm being of substantial thickness and anchored upon the stem 104 between an upper dished diaphragm plate 107 and a lower dished diaphragm plate 108. The lower plate 108 seats upon an enlargement 109 on the valve stem 104 and the upper plate bears against the portion 105 of the diaphragm 106 and is retained by means of a lock nut 111 and a lock washer 112. The outer periphery of the diaphragm 106 is clamped between the flanged periphery of the cap 98 and the valve body 58.

An expansion or coil spring 113 seats at its upper end against the lower diaphragm plate 108 and at its lower end seats against an annular shoulder on an externally threaded lock nut 114 bearing at its lower end against a slip or retainer ring 115 for anchoring the outer peripheral edge of an elastic diaphragm 116 between the slip or retainer ring 115 and an annular shoulder 117 in the valve body 58. The elevated central portion of the diaphragm 116 is mounted in a lower diaphragm assembly including a sleeve 118 having an inwardly opening annular groove containing an O-ring 119 in wiping and sealing contact with an encompassed plunger tube 121. This sleeve has an annular shoulder for receiving the central part of the diaphragm 116, with the latter clamped between this shoulder and a collar 122. To lock the collar and sleeve together, the upper portion of the sleeve 118 is formed as an annular flange and its upper end is turned or formed over the adjacent edge of the collar to lock these parts together. The upper end of this annular flange abuts a snap ring 123 anchored to the plunger tube 121.

The drain valve assembly in the valve body 58 includes the valve stem 104 having a flared or conical drain valve 124 on its lower end, and the encompassing plunger tube 121 spaced from the valve stem 104 to provide an annular passage therebetween. At its upper end the plunger tube is vertically slotted at 125 and during the backwashing and rinsing cycles of the regeneration operation this slotted end engages the lower plate 108, and during normal service operation (FIG. 2) and bringing this slotted end 125 is spaced from the lower plate 108.

The plunger tube 121 at its lower end is provided with an enlargement 126 and an encompassing elastic or sealing covering providing a valve member 127 adapted to be elevated into contact with an annular valve seat 128 in the valve body as shown in FIG. 2, or lowered into contact with an annular valve seat 129 in the female part of the slip coupling or connector 14.

While the lower diaphragm assembly, including the diaphragm 116, the sleeve 118 and the collar 122, is normally maintained in elevated position as shown in FIG. 2 by hydraulic pressure, this assembly is depressed during the backwashing and rinsing cycles by the lowering of the plunger tube 121 with its snap ring 123 forcing the sleeve 118 and its collar 122 downwardly and thereby lowering the central portion of the lower diaphragm 116.

The chamber 101 is connected through an elastic flow control 131 and an aligned opening 130 in the upper diaphragm 106 to a port 132 communicating with a drain opening 133 from the chamber 134 of the valve body 58. A chamber 135 below the lower diaphragm assembly communicates with the by-pass tube 59. As more clearly shown in FIG. 3, the inlet or opening 60 for entry of the untreated water is also provided with a port 136 communicating with a cylindrical screen 137 in a chamber 138. This chamber 138 communicates through an aligned opening 139 in the upper diaphragm 106 with a connecting chamber and channel 140 adapted to open into the chamber 99 in the cap 98 for the diaphragm body or the valve housing 58.

In the chamber 99 projects a plunger or valve member 141 of a solenoid 142, the operation of which is controlled by a timer 143. The solenoid plunger or valve 141 is adapted to open and close a port 144 communicating with the chamber 99 in the diaphragm cap.

In the regeneration cycle, brine collected to the desired depth in the float chamber 25 enters the upper chamber 44 of the valve body 36 (FIG. 5) through the opening 47 in the cover 37 and about the valve stem 28, it being understood that the valve seating portion or member 29 is depressed from the position shown in FIG. 5 to its lowered position in which it seats upon the transverse partition 42, to permit discharge of the brine through the opening 47. From the upper chamber 44 the brine passes through the slots 48 in the valve seating portion 29, through the opening or port 43 into the lower or air check valve chamber 47 of the valve body, and then is drawn through the pipe 35 and tubing 53 into the inlet port or connection 84 of the eductor body 57 for passage through the system.

The brine continues to flow as stated above until the level of the brine in the float chamber 25 drops to the top of the port or opening 47 in the cover 37, whereupon air is drawn into the valve body through this opening and into the air check chamber 45. When this occurs the ball valve 49 sinks and seals off passage through the gasket 41 and stops all flow of brine or air, and remains in this position until the brine is rinsed from the tank 10 as part of the automatic regeneration cycle.

When regeneration has been completed, fresh water flows under pressure through the tubing 53 and pipe 35 into the valve body 36 where upon entering the chamber 45 it buoys up the ball valve 49 to close and seal off the opening 43 in the partition 42. However, water flows into the upper chamber 44 through the small orifice or by-pass 46 which limits the flow so as not to raise the valve seating member 29 due to velocity head. The water slowly entering the upper chamber 44 exits through the opening or port 47 about the valve stem 28, flows into the float chamber 25 and through the restricted opening 55 into the lower portion of the salt chamber 23. This flow continues until the water reaches the level of the ball float 31, whereupon continued flow carries this ball upwardly until the valve seating member reaches the position shown in FIG. 5. When this occurs flow of water into the brine tank 21 ceases until water is again required to form a new supply of brine.

The operation of the novel control valve assembly, the position of the operative parts thereof and the path of flow during service and regeneration are as follows:

*Normal flow in service*

During normal service flow, hard or untreated water enters the inlet opening 60, passes through the port 61 into the chamber 62, down through the bore or passage 63 in the connector 14 to the inlet distributor 16 and through its slots 18, down through the bed of minerals 11 and gravel 12 and through the slots 19 into the long outlet tube or manifold 17. The treated water passes out of the tank 10, into the eductor body 57 of the control valve assembly by means of the passage 64 in the connector 15. From the passage 64 the treated water passes through the openings 65 in the spider 66 and enters the chamber 67 when the velocity pressure of the entering water causes the check valve 68 to raise. The check valve being spaced from the interior of the eductor body 57 and freely slidable on the depending tubular part 74 of the eductor housing 73, the treated water flows into the chamber 67 whenever the check valve 68 is displaced. From the chamber 67 the treated water flows through the port 69 at the rear of the eductor body 57 and into the supply line of the water system.

In this service flow position of the valve assembly, spring 113 in the valve body 58 exerts upward force against the diaphragm plate 108 causing the valve stem 104 to raise and the drain valve 124 to seat against the lower end of the elastic plunger valve 127. This spring-biasing force raises and seats the drain valve 124 in contact with the plunger valve 127 with the valve 124 retained closed by the pressure of the entering water.

*Regeneration*

When the signal is received from the timer 143 for regeneration, the solenoid 142 on the diaphragm body or valve housing 58 is energized and causes its plunger or pilot valve 141 to rise, whereupon untreated or raw water enters the inlet opening 60 and passes through the port 136 communicating with the interior of the filtering screen 137 in the chamber 138. Water then passes through the screen 137 and the connecting channel 139 and port 144 into the chamber 99 of the diaphragm body cap 98. Water under line pressure in the chamber 99 exerts force on the upper diaphragm 106 and causes it to be displaced in a downward direction. Line pressure is maintained in the chamber 99 because of the restrictive orifice of the pressure sensitive flow control 131 in the chamber 101, this orifice being substantially smaller than the port 136 holds pressure within the chamber 99 while permitting a small relief flow through the port 132 connected to the drain opening 133. In this preferred embodiment the restricted orifice 131 is a pressure sensitive flow control which restricts the relief flow rate to approximately the same value over a wide pressure range.

As water pressure in the chamber 99 exerts force against the upper elastic diaphragm 106, the latter is forced downwardly causing the spring 113 to be compressed and causing the valve stem 104 and the drain valve 124 to open. As the diaphragm 106 moves further downward, its diaphragm plate 108 engages the upper slotted end 125 of the plunger valve tube 121 and causes the entire plunger valve assembly including the stem 104 and the plunger tube 121 to move downwardly and the valve member 127 on the lower end of the tube 121 to engage the valve seat 129 on the coupling 14.

Untreated or raw water which enters the diaphragm or valve body 58 through the inlet connection 60 and port 61 flows into the chamber 62 (FIG. 2) where it is directed through the then open port encompassed by the valve seat 128 into the chamber 135. Thus untreated water continues to flow through the connector or by-pass 59 which joins the eductor body 57 and the valve body 58. Water is now free to enter the chamber 67 of the eductor body where it is directed upwardly through the channel 81 into the chamber 79, through the filter screen 92 and into the chamber 93.

Water from the chamber 93 passes through openings in the spring 87, through the channel 82 and is then directed downwardly to the constricted orifice 86 of the flow regulator or nozzle 85, through the channel 82 formed by the encompassing spring. The sealing O-ring prevents leakage of water around the flow regulator or nozzle 85 and the eductor housing 73. Water passing through the flow regulator or nozzle 85 enters the throat 75 of the eductor creating a vacuum in the channel 83 and causing brine to flow from the brine tank 21 (FIG. 1), through the brine valve 26, pipe 35 and tube 53 connected to the threaded connection 84. Brine entering channel 83 mixes with water from the flow regulator or nozzle 85 in the throat 60 and is directed downward as a diluted brine into the tank 10 through the port 64 of the fitting 15.

The check valve 68 in sealing contact with the spider 66 prevents water from the chamber 67 from entering directly into chamber 64, but water in the chamber 67 may be directed to flow through the outlet port 69 into the supply system of the house to satisfy any demand for water. This constitutes an untreated water by-pass which permits water to be drawn when the water conditioning system is being regenerated or rejuvenated.

The dilute brine flows from fitting or coupling 15 into the outlet distributor tube 17 through its slots 19 and upwardly through the gravel 12 and the mineral bed 11 causing regeneration of these minerals contained in the tank. The upward velocity of the diluted brine creates a lifting action which also floats off turbidity which may have collected on the mineral bed 11 during the service operation. Brine regenerating the bed of minerals passes through the slots 18 of the normal inlet distributor 16 with the waste brine solutions entering the control valve body 58 through the port 63 in the fitting coupling 14 where the waste brine enters the annular space 145 in the plunger valve assembly as the drain valve 124 is then open. From the annular space 145, the waste brine flows out through the slots 125 in the upper end of the plunger tube 121 into the chamber 134 connected to the drain connection 133. A drain tube 146 is used to carry away the waste brine to a suitable drain in the household plumbing system. Relief water from the chamber 99 flowing through the orifice of the flow control 131 also flows through the drain connection 133 and the drain line 146 to waste.

Brine continues to flow in the manner described above until a predetermined quantity is withdrawn from the brine tank. At that point the ball valve 49 in the brine tank causes the brine flow to stop after which the rinse water alone follows the designated path.

Once the rinse step has been completed, a signal is received which de-energizes the plunger valve 141 of the solenoid valve 142 to seal the port 144 communicating with the chamber 99 in the cap 98. This stops the flow of water from the line and pressure in the chamber 99 is relieved to drain through the orifice of the flow control 131. Line pressure in the chamber 135 exerts a force on the lower diaphragm 116 carried by the lower diaphragm assembly encompassing the plunger valve tube 121. This force is directed to the plunger valve 127 and plunger tube 121 through the snap ring 123 secured therein causing this plunger tube 121 and its valve 127 to move upwardly bringing the upper end of its sealing portion in sealing contact with the valve seat 128 of the diaphragm valve body 58. The spring 113 exerts a force against the lower diaphragm plate 108 causing the drain valve 124 to close under positive spring pressure. The valve assembly is now in the service flow position and untreated water will now be directed through the water conditioning apparatus in the manner previously described with respect to service operation.

Refill of the float chamber 25 of the brine tank with soft or treated water is accomplished after rinsing has been completed and during service operation when the soft or treated water is also free to flow or by-pass through the throat 75 of the eductor housing 73, through the connected channel 83, tube 53 and pipe 35 into the float chamber 25 until this chamber is filled to a predetermined depth determined by the float valve. When the float valve closes, further flow of soft water to the float chamber 25 of the brine tank is stopped.

When in service operation, the untreated water continues at line pressure, hereinafter designated (LP), from the inlet 60 to the tank 10 while the soft or treated water emerging from the tank is under line pressure minus the pressure drop through the tank service operating pressure, hereinafter designated (OP). The line pressure (LP) also exists in the port 136 and chambers 138 and 140 to the then closed solenoid valve plunger 141, while the pressure (OP) exists in the eductor throat 75, flow regulator 85, connecting port 82, chamber 79, channel 81, and with the check valve 68 elevated, this pressure also exists in the outlet port 69 connected to the service line, and in the connecting tube 59 and chamber 135 in the valve housing 58, with the diaphragms 106 and 116 moved to elevated position. This pressure (OP) also exists in the channel 83, tube 53, pipe 35 and into the valve housing 26 in the float chamber 25 of the brine tank 21. Atmospheric pressure exists in the drain opening 133, drain tube 146 and in the connected chamber 134, and also in the chamber 99 in the diaphragm cap 98.

During the backwashing and brining cycles, the line pressure (LP) exists in the inlet 60, communicating port 61 and then communicating chamber 135 in the valve housing 58, connecting tube 59, chamber 67 in the eductor housing 57 and outlet port 69 connected to the service line, so that untreated water may be by-passed to the service line during backwashing and brining. Line pressure minus the pressure drop through the flow control 85 and eductor housing 73, hereinafter designated (RP), exists in the bore or passage of the normal outlet coupling or connector 15, through which the water passes in a direction reverse to that during service operation. In these backwashing and brining cycles, the valve 124 is open so that the effluent under pressure (RP) flows through the annular passage 145 in the plunger tube 121 of the valve housing 58, into the chamber 135 and out through the drain opening 133 and drain tube 146.

During backwashing and brining, line pressure (LP) also exists in the port 136, chambers 138 and 140, and with the solenoid valve plunger or pilot valve 141 energized to open position this line pressure exists in the chamber 99, channel 102 and chamber 101, so that both diaphragms are depressed to lower the plunger valve assembly including the valve stem 104 and the plunger tube 121. A vacuum exists in the brine tube 53 leading from the brine valve 26 into the channel 83 and the throat 75 of the eductor housing 73, and line pressure (LP) exists in the channel 81, chamber 79, channel 82 to the flow control or regulator 85. The entering untreated water flowing through the flow control or regulator 85 where its line pressure is reduced, withdraws brine from the brine chamber 25 and mixes therewith in the throat 75 for passage through the tank in a reverse direction and, when the brine supply is completed, rinse water alone flows in this designated path with the effluent from brining and rinsing flowing upwardly through the then open annular passage 145 in the plunger tube 121 to drain.

In an alternate arrangement for backwashing certain filters without requiring the addition of a chemical or brine solution, the eductor section 57 of the valve assembly may be replaced with a T connection 147 as shown in FIG. 4. When the filter requires rejuvenation and the automatic control valve is operated to direct all flow through the conduit 59, backwashing water enters the T connection and flows downward through the opening 148 of a fitting 149 connected with the outlet tube 17 in the tank 10. Untreated water may also flow to the supply pipe through a connection 151 to the service line if there is a demand during the rejuvenation period. Water entering the outlet tube 17 flows through its slots 19 and percolates up through the filter bed which replaces the minerals 11 in the softener tank, thus causing a cleaning action and removal of collected turbidity through the inlet tube 16 of the filter and then out to waste through the control valve following the previously described path of the waste brine and rinse water in the regeneration of the contents of the softener tank.

A restricting orifice or flow control similar to the flow control 131, when placed in the drain line 146 from the valve body 58, regulates the flow of backwashing water through the filter. The operation of the filter is preferably controlled automatically by means of the disclosed timer and electrical solenoid or pilot valve. While we prefer to use a solenoid valve as the pilot valve, either the softener or filter may be controlled by means of a manual or mechanically controlled valve used to open and close the port 144 of the cap 98.

The flow controls 85 and 131 consist of a rubber or elastic member having a restricted opening, with the flow control mounted between spaced rigid washers or spaced rigid annular flanges for mounting and retaining the flow control in position in a passage. The mounting for the flow control 85 is shown provided with a sealing or O-ring for sealing contact in the eductor housing 73.

While line pressure is disclosed as supplied to the chamber 99 of the cap 98 under control of the solenoid or pilot valve 141, it is further contemplated that the valve assembly may be operated by supplying pressure to the chamber 99 in the cap 98 from a remote source rather than as disclosed herein.

It is to be further noted that the solenoid plunger or pilot valve 141 in the novel arrangement herein disclosed, handles none of the waste effluent, but is for the sole purpose of supplying pressure to the chamber in the cap 98 with this pilot valve being supplied with water under greater pressure than that of the effluent stream during regeneration.

Having thus disclosed the invention, we claim:

1. A hydraulically-actuated valve assembly, comprising a valve body having plural ports including an inlet port, a pair of axially spaced outlet ports and a drain port, a hollow plunger longitudinally movable in said valve body and provided with a valve movable therewith in opposite directions to seal against flow through one or the other of said axially spaced outlet ports whereby flow may be directed from said inlet port to either of said axially spaced outlet ports, sealing means surrounding said hollow plunger, secured to said valve body and positioned below said drain port, and a valve stem within and encompassed by and spaced from the interior of said hollow plunger to provide a flow passage therebetween, said valve stem provided at one end with a valve movable relative to said hollow plunger to control flow through said passage to the drain port and seal said flow passage through the adjacent end of said hollow plunger.

2. A hydraulically-actuated valve assembly as set forth in claim 1, including an actuating diaphragm for moving said hollow plunger and its valve between two positions to control the flow to one of the two outlet ports and for moving said valve stem and its valve to open flow through said hollow plunger to said drain port.

3. A hydraulically-actuated valve assembly as set forth in claim 1, including a pressure-actuated diaphragm for moving said hollow plunger and its valve between two positions to control the liquid flow to either of said outlet ports and for moving said valve stem and its valve to open flow to the drain port through said hollow plunger, and a pilot valve for controlling the supply of fluid under pressure to one side of said diaphragm.

4. A hydraulically-actuated valve assembly as set forth in claim 1, including an actuating diaphragm for shifting said hollow plunger to move its valve between two positions to control the liquid flow to either of the outlet ports and for moving said valve stem and its valve to open position permitting flow to said drain port through said hollow plunger, said diaphragm, hollow plunger and valve stem being so constructed and arranged whereby actuating said diaphragm in one direction opens the valve on said valve stem and permits flow through said hollow plunger before the valve on said hollow plunger is moved from one position to the other, and said sealing means including a second diaphragm bridging said valve body and spaced from said actuating diaphragm, said second diaphragm being mounted on said hollow plunger intermediate the ends thereof.

5. A hydraulically-actuated valve assembly as set forth in claim 1, including a pressure-actuated diaphragm for moving said hollow plunger and its valve between two positions to control liquid flow to one of the two outlet ports and for moving said valve stem and its valve to open flow to said drain port through said hollow plunger, a pilot valve for controlling the supply of fluid under pressure to one side of said diaphragm, and a flow regulator communicating with the said one side of the diaphragm for retaining said fluid under pressure.

6. An automatic valve assembly for controlling the direction and flow of liquid therethrough, comprising a valve unit having a valve body with an inlet port, and untreated liquid inlet, a by-pass port for the passage of untreated liquid and a drain port, valve means in said body including two vertically spaced elastic diaphragms bridging the valve body and dividing the interior of the body into an upper chamber above the upper diaphragm, an intermediate chamber between said diaphragms and communicating with said drain port and a chamber below the lower diaphragm communicating with said by-pass port, a valve stem secured at one end to the upper diaphragm and movable relative to said valve body, a valve at the lower end of said valve stem, a plunger tube encompassing but spaced from said valve stem to provide an annular passage therebetween and movable relative to said valve body, said plunger tube connected intermediate its ends to the lower diaphragm, said valve on the valve stem normally closing the lower end of the plunger tube and being moved to open position relative to the plunger tube when the upper diaphragm is depressed by line pressure from above, tension means between the upper and lower diaphragms to normally close the plunger tube with the valve on the valve stem, an elongated plunger valve on the lower end of the plunger tube, spaced annular valve seats in said valve body between which the plunger tube moves for sealing contact with either of said seats, a chamber in said valve body between said valve seats and communicating with said inlet port and said untreated liquid inlet with liquid being directed from said inlet port into said chamber and to said untreated liquid port when the plunger valve is seated against the upper valve seat, an eductor unit having a treated liquid outlet, an outlet port, a by-pass port and a regenerant port and a single external conduit connecting the by-pass ports of the valve unit and the eductor unit in predetermined spaced relation, said valve body having a passage from said inlet port to said upper chamber, a pilot valve controlling flow from said inlet port to said upper chamber, said pilot valve when actuated allowing line pressure of the entering untreated liquid to depress the upper diaphragm causing the plunger valve to seat on the lower valve seat and the valve stem to move to open the annular passage in the plunger tube to communicate with the untreated liquid inlet and the drain port, the inlet port of the valve unit communicating with the service line and the eductor unit through the external conduit.

7. An automatic valve assembly for controlling the direction and flow of liquid therethrough, comprising in combination a valve unit, an eductor unit and a single tube connecting said units, said valve unit having an inlet port connected to the liquid supply, said eductor unit having an outlet connected to a service line and time-actuated means for automatically controlling the flow through said units, said valve unit including a valve body having an untreated liquid inlet, a by-pass port and a drain port, spaced upper and lower diaphragms bridging the interior of said valve body to provide an upper chamber above the upper diaphragm communicating with said liquid supply, an intermediate chamber between said diaphragms communicating with the drain port and a chamber below the lower diaphragm communicating with the by-pass port, and a valve assembly in said valve body including a valve stem connected adjacent its upper end to the upper diaphragm and at its lower end provided with a valve, a plunger tube encompassing and spaced from said valve stem to provide an annular passage therebetween and with the valve on the valve stem disposed at the lower end of the plunger tube, said lower diaphragm being mounted on the plunger tube intermediate its ends, means between said diaphragms for spring-biasing the valve stem upwardly relative to the plunger tube, said plunger tube being movable relative to the valve body and having a plunger valve at its lower end, spaced valve seats in the valve unit and arranged above and below the plunger valve, a chamber provided between said valve seats and normally communicating with said inlet port and said untreated liquid inlet, said valve stem being movable relative to said valve body and said plunger tube, a valve controlling flow of liquid to said upper chamber above said upper diaphragm, said eductor unit having an eductor tube communicating with said liquid outlet, a regenerant port communicating with said eductor tube intermediate its ends, a chamber surrounding the eductor tube and communicating with the outlet connected to the service line and a by-pass port communicating with the by-pass port in the valve unit through the tube connecting the units with said last mentioned chamber.

8. An automatic valve assembly as set forth in claim 7, in which the last mentioned chamber also communicates with the upper end of the eductor tube for supplying liquid thereto from the connecting tube.

9. An automatic valve assembly as set forth in claim 7, in which the eductor unit is provided with a stationary ported member between the liquid outlet and the last mentioned chamber and a check valve for controlling flow through said ported member.

10. An automatic valve assembly for controlling the direction and flow of liquid therethrough, comprising a valve unit having an inlet port from a supply line, an untreated liquid port, a drain port and a by-pass port, an eductor unit having a treated liquid outlet, an outlet port leading to a service line and a by-pass port, and a single conduit connecting said by-pass port of the valve unit to said by-pass port of the eductor unit whereby the units can be spaced an optimum distance apart, said valve unit including a valve body, a valve stem having a valve at its one end, a diaphragm bridging the interior of said body and mounted on the other end of the valve stem, a plunger tube encompassing but spaced from said valve stem to form an annular passage with the valve on said valve stem projecting through one end of said tube and the other end of said tube being disposed adjacent said diaphragm, a second diaphragm bridging the interior of the valve body and mounted on said plunger tube intermediate its ends, a chamber between said diaphragms and communicating with said drain port and with the annular passage in the plunger tube, spaced valve seats in said valve body, an elongated valve on the end of the plunger tube adjacent the valve on the valve stem and movable into seating contact with either of said valve seats, said valve stem being movable relative to both the valve body and the plunger tube with said valves when in service position allowing communication between the inlet port and the untreated liquid inlet and when in actuated position establishing communication between the inlet port and the by-pass ports through said conduit to by-pass liquid to the service line and establishing communication between the untreated liquid inlet and the drain port through the annular passage in the plunger tube.

11. An automatic valve assembly as set forth in claim 10, in which the eductor unit includes an eductor tube, a chamber about the eductor tube communicating with its by-pass port and said conduit and with the outlet port leading to the service line, a regenerant port communicating with the eductor tube and a check valve between the treated liquid outlet and said chamber to control flow therebetween.

12. An automatic valve assembly as set forth in claim 11, including a stationary ported member and a spring-biased check valve for controlling flow through said ported member from the treated liquid outlet to the outlet port to the service line.

13. An automatic valve assembly as set forth in claim 11, in which the chamber about the eductor tube communicates with the upper end of the eductor tube and the lower end of the eductor tube communicates with the treated liquid outlet.

References Cited in the file of this patent

UNITED STATES PATENTS

| | | |
|---|---|---|
| 2,620,299 | Deters et al. | Dec. 2, 1952 |
| 2,670,328 | Webb | Feb. 23, 1954 |
| 2,800,143 | Keller | July 23, 1957 |
| 2,825,363 | Bird | Mar. 4, 1958 |
| 2,906,332 | Rosten et al. | Sept. 29, 1959 |
| 2,907,462 | Webb | Oct. 6, 1959 |